(12) United States Patent
Kaabouch et al.

(10) Patent No.: US 7,774,587 B2
(45) Date of Patent: Aug. 10, 2010

(54) DYNAMIC REDUNDANCY CHECKER AGAINST FAULT INJECTION

(75) Inventors: Majid Kaabouch, Rousset (FR); Yves Fusella, Aubagne (FR); Laurent Paris, Rousset (FR)

(73) Assignee: Atmel Corporation, San Jose, CA (US)

( * ) Notice: Subject to any disclaimer, the term of this patent is extended or adjusted under 35 U.S.C. 154(b) by 1002 days.

(21) Appl. No.: 11/486,232

(22) Filed: Jul. 12, 2006

(65) Prior Publication Data

US 2008/0034264 A1  Feb. 7, 2008

(51) Int. Cl.
G06F 9/00 (2006.01)
(52) U.S. Cl. .............................. 713/1; 713/2
(58) Field of Classification Search ............... 713/190
See application file for complete search history.

(56) References Cited

U.S. PATENT DOCUMENTS

| | | |
|---|---|---|
| 5,251,304 A | 10/1993 | Sibigtroth et al. |
| 5,261,058 A | 11/1993 | Squires et al. |
| 5,446,864 A | 8/1995 | Burghardt et al. |
| 6,247,151 B1 * | 6/2001 | Poisner ........................ 714/718 |
| 6,453,417 B1 | 9/2002 | Milios et al. |
| 6,505,279 B1 | 1/2003 | Phillips et al. |
| 6,591,385 B1 * | 7/2003 | Krech et al. ................. 714/718 |
| 7,184,545 B2 * | 2/2007 | Fujiwara ........................ 380/2 |
| 2002/0077782 A1 | 6/2002 | Fruehling et al. |

FOREIGN PATENT DOCUMENTS

| | | |
|---|---|---|
| WO | WO-2008/008736 A3 | 1/2008 |
| WO | WO-2008008736 A2 | 1/2008 |

OTHER PUBLICATIONS

PCMag (Jeff, Prosise, "Digital Signatures: How They Work", PC Magazine Apr. 1996).*
"International Application Serial No. PCT/US2007/073084, International Search Report and Written opinion mailed Sep. 10, 2008", p. 220.

* cited by examiner

*Primary Examiner*—Kambiz Zand
*Assistant Examiner*—Peter Poltorak
(74) *Attorney, Agent, or Firm*—Schwegman, Lundberg & Woessner, P.A.

(57) ABSTRACT

A method and system for checking data stored in a memory of in a computer system is disclosed. The memory includes a plurality of memory addresses. The method and system include providing a signature generator coupled with the memory, providing a checker memory coupled with the signature generator and separate from the memory, and providing an address remapper coupled with the checker memory and the memory. The signature generator provides at least one signature corresponding to the data, which resides in a protection window of the memory. The protection window includes at least one memory address of the plurality of memory addresses. The checker memory stores the at least one signature in at least one checker address, which corresponds to the at least one memory address. The address remapper for translates between the at least one memory address and the at least one checker address.

24 Claims, 6 Drawing Sheets

DYNAMIC REDUNDANCY CHECKER AGAINST FAULT INJECTION

FIELD OF THE INVENTION

The present invention relates to computer systems and more particularly to a method and system for checking for fault injection.

BACKGROUND OF THE INVENTION

Secure microcontrollers and other similar computers systems may be subject to external attack. Such attacks typically aim to control circuit behavior and extract sensitive information. Because program memories are easy to localize on silicon and are typically important to the security of the system, program memories are also typically targets of external attack. Consequently, conventional methods for protecting such memories are used to protect against such attacks.

FIG. 1 depicts a conventional computer system 10, such as a microcontroller, that is protected against external attacks in a conventional manner. The conventional computer system 10 is depicted as including a conventional system central processing unit (CPU) 12, a conventional program memory 14, and a conventional checker 20 that outputs a strategy 26. Although only these components are depicted, the conventional computer system 10 typically includes other components that, for clarity, are not shown. The conventional program memory 14 is depicted as included a conventional word 16 and a corresponding parity bit 18. The program memory data output includes n-bit data word 16 and a corresponding parity bit 18 which is calculated for each program memory location and stored at the same memory address. The n-bit data word typically includes CPU instructions which are stored to be fetched at some later time by the CPU 12. Although only a single conventional word 16 and a single parity bit 18 are shown, one of ordinary skill in the art will readily recognize that the conventional program memory 14 typically includes other data words that are not separately indicated for simplicity. The conventional checker 20 includes a conventional parity bit calculator 22 and a NAND gate 24.

FIG. 2 depicts a conventional method 50 for protecting the conventional computer system 10. For each n-bits of data stored in the conventional program memory 14, a corresponding parity bit 18 is calculated, via step 52. The conventional word 16 is stored in one location in the conventional program memory 14 while the corresponding parity bit 18 is also separately stored in the program memory 16, via step 54. Upon request for program instructions to be extracted, in step 54, the conventional computer system 10 separately provides the conventional word 16 and the parity bit to the checker 20, via step 56. A parity bit is determined from the conventional word 16 using the parity bit calculator 22, via step 58. The parity bit calculated from the conventional word 16 is compared to the corresponding parity bit 18 preferably using the NAND gate 24, via step 60. Based on the comparison, a security strategy 26 may be provided, via step 62. If the comparison performed in step 60 indicates that the parity bits match, then the security strategy 26 may simply include providing the instructions or other data corresponding to the conventional word 16 from the conventional program memory 14 to the conventional system CPU 12. However, if the comparison indicates that the parity bits do not match, then the security strategy 26 may include other actions. For example, a security interrupt, a security reset, or other operation may be performed.

Although the conventional method 50 provides some protection for the conventional system 10, one of ordinary skill in the art will recognize that the conventional method 50 has some drawbacks. For example, the use of the parity bit 18 conventional checker 20 does not detect more than a single bit error. Thus, other errors may not be distinguished. In addition, use of the parity bit 18 requires storage of one bit per word 16. Consequently, the size of the entire conventional program memory 14 is increased.

Accordingly, what is needed is an improved method and system for providing computer systems from external attack. The present invention addresses such a need.

BRIEF SUMMARY OF THE INVENTION

The present invention provides a method and system for checking data stored in a memory of in a computer system. The memory includes a plurality of memory addresses. The method and system comprise providing a signature generator coupled with the memory, providing a checker memory coupled with the signature generator and separate from the memory, and providing an address remapper coupled with the checker memory and the memory. The signature generator provides at least one signature corresponding to the data, which resides in a protection window of the memory. The protection window includes at least one memory address of the plurality of memory addresses. The checker memory stores the at least one signature in at least one checker address, which corresponds to the at least one memory address. The address remapper for translates between the at least one memory address and the at least one checker address According to the method and system disclosed herein, the present invention may provide an improved method for protecting the data against external attack.

DETAILED DESCRIPTION OF THE INVENTION

The present invention relates to protection of data in computer systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for checking data stored in a memory of in a computer system. The memory includes a plurality of memory addresses. The method and system comprise providing a signature generator coupled with the memory, providing a checker memory coupled with the signature generator and separate from the memory, and providing an address remapper coupled with the checker memory and the memory. The signature generator provides at least one signature corresponding to the data, which resides in a protection window of the memory. The protection window includes at least one memory address of the plurality of memory addresses. The checker memory stores the at least one signature in at least one checker address, which corresponds to the at least one memory address. The address remapper for translates between the at least one memory address and the at least one checker address.

The present invention will be described in terms of a computer system having particular components. However, one of ordinary skill in the art will readily recognize that the method and system in accordance with the present invention may utilize other components consistent with the present invention. Moreover, the present invention is described primarily in the context of a single protection window in a memory. However, one of ordinary skill in the art will recognize that the method and system function with multiple protection windows. In addition, although the method in accordance with the present invention is described in the context of methods having a certain number of steps that are described as proceeding in a particular order, one of ordinary skill in the art will recognize that multiple steps might be performed in parallel. Furthermore, for clarity, steps and components may be omitted. In addition, the system and method are described in the context of single components, such as a single signature generator, address remapper, and signature checker. However, one of ordinary skill in the art will recognize the multiple ones of such components may be utilized.

Figure 1:
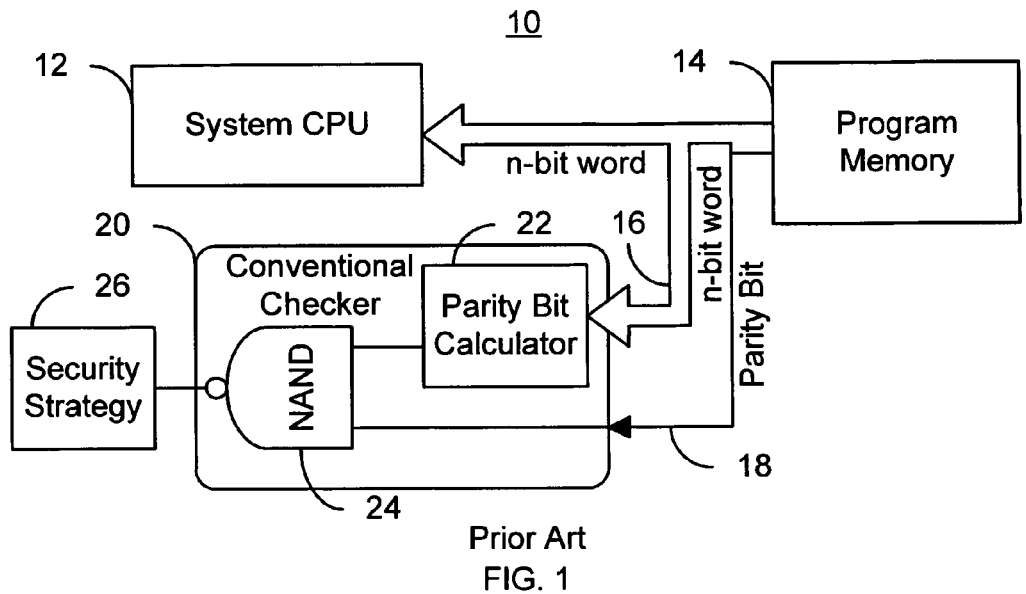
FIG. 1 is diagram depicting a system for protecting data in a computer system.
Figure 2:
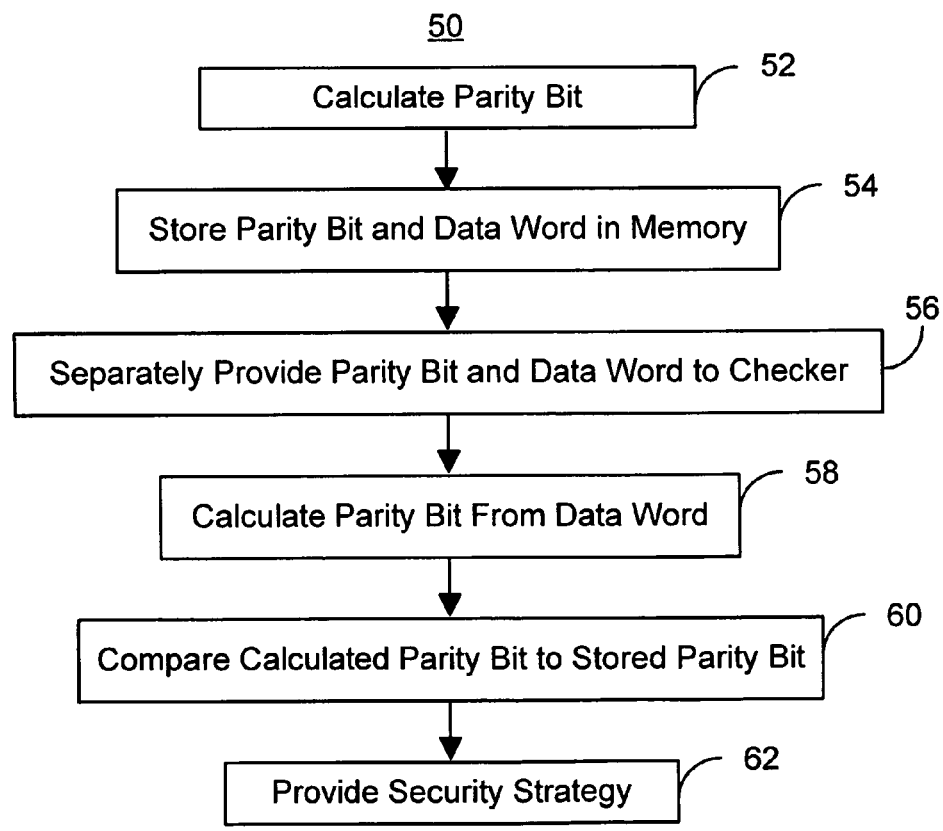
FIG. 2 is a diagram of a conventional method for checking data in a computer system.
Figure 3:
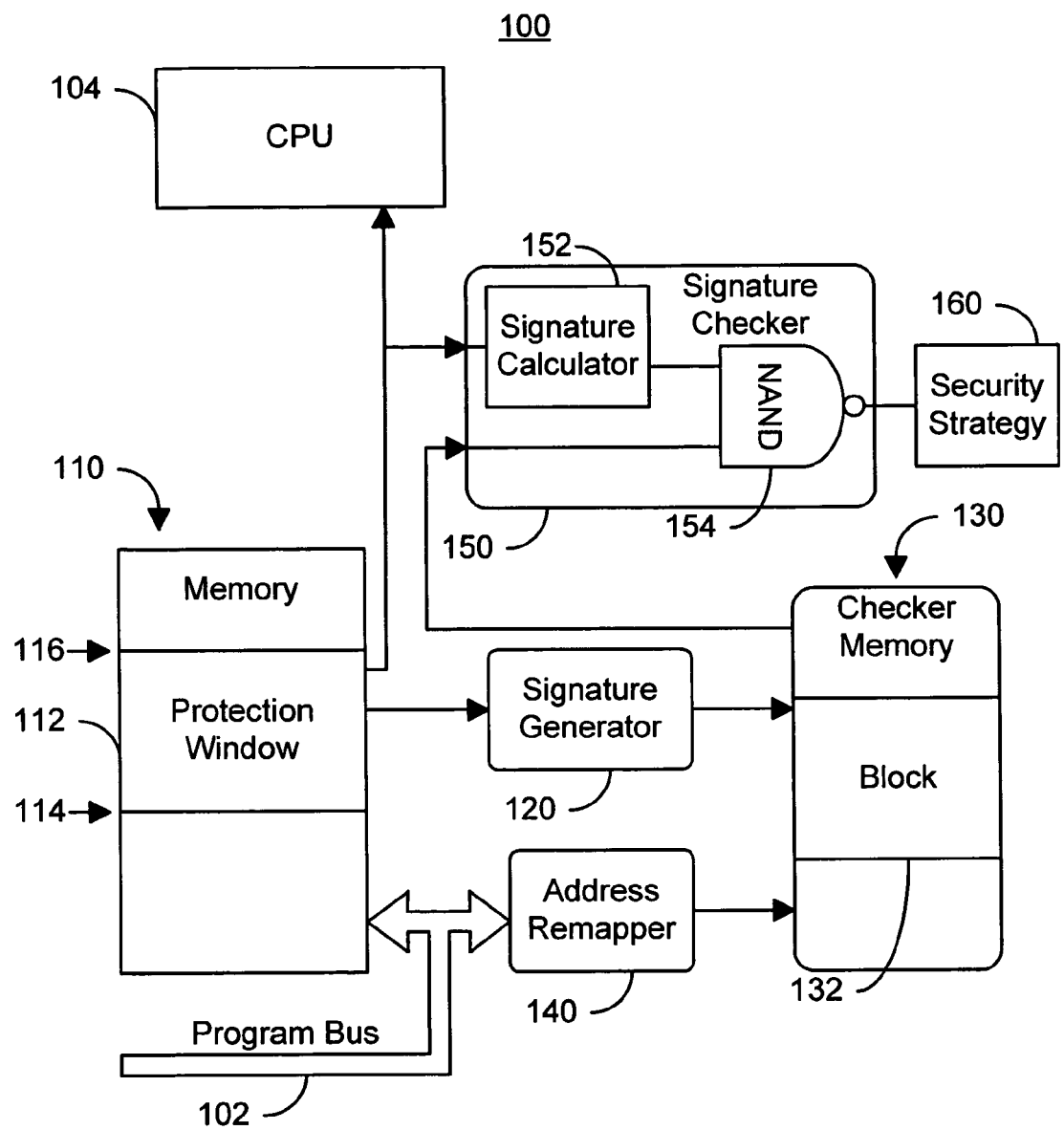
FIG. 3 is a diagram one embodiment of a system in accordance with the present invention for protecting data in a computer system.

To more particularly describe the system and method in accordance with the present invention FIG. 3 is a diagram one embodiment of a system in accordance with the present invention for protecting data in a computer system. The computer system 100 includes a central processing unit (CPU) 104 that is desired to be kept secure against external attack as well as a program bus 102. The computer system 100 also includes a memory 110, a signature generator 120, a dedicated checker memory 130, an address remapper 140, and a signature checker 150 that provides a security strategy 160.

The memory 110 is preferably a program memory that stores instructions. The data within the memory 110 that is desired to be protected resides within the protection window 112. The protection window 112 is bounded by addresses 114 and 116. Thus, the memory 110 preferably stores instructions for the CPU 104 desired to be kept secure. Note that although the system 100 is described in the context of having a single protection window 112, the system 100 can operate effectively with multiple program windows. The signature generator 120 generates signatures corresponding to the data in the protection window 112 and provides the signatures to the checker memory 130. The address remapper 140 translates between addresses in the memory 110 (memory addresses) and addresses in the checker memory 130 (checker addresses). The checker memory 130 is a dedicated memory separate from the memory 100 storing data to be protected. In a preferred embodiment, the checker memory 130 is a random access memory (RAM). The signature checker 150 includes a signature calculator 152 and a comparison block 154 that is preferably a comparator represented by the NAND gate 154. Thus, the signature checker 150 computes signatures based upon the data from the protection window 112 and compares the calculated signature to the corresponding signatures stored in the checker memory 130. Based upon this comparison, the signature checker 150 outputs a security strategy 160. The security strategy 160 preferably allows the CPU 104 to execute the instructions if the calculated signatures match the signatures stored in the checker memory 130. If the signatures do not match, then a fault has been introduced into the memory 110, in the checker memory 132, in the signature checker 150, in the address remapper, for example through an error or external attack. Consequently, the signature checker 150 provides a security strategy 160, such as an internal security reset of a security interrupt if the calculated signatures do not match.

Figure 4:
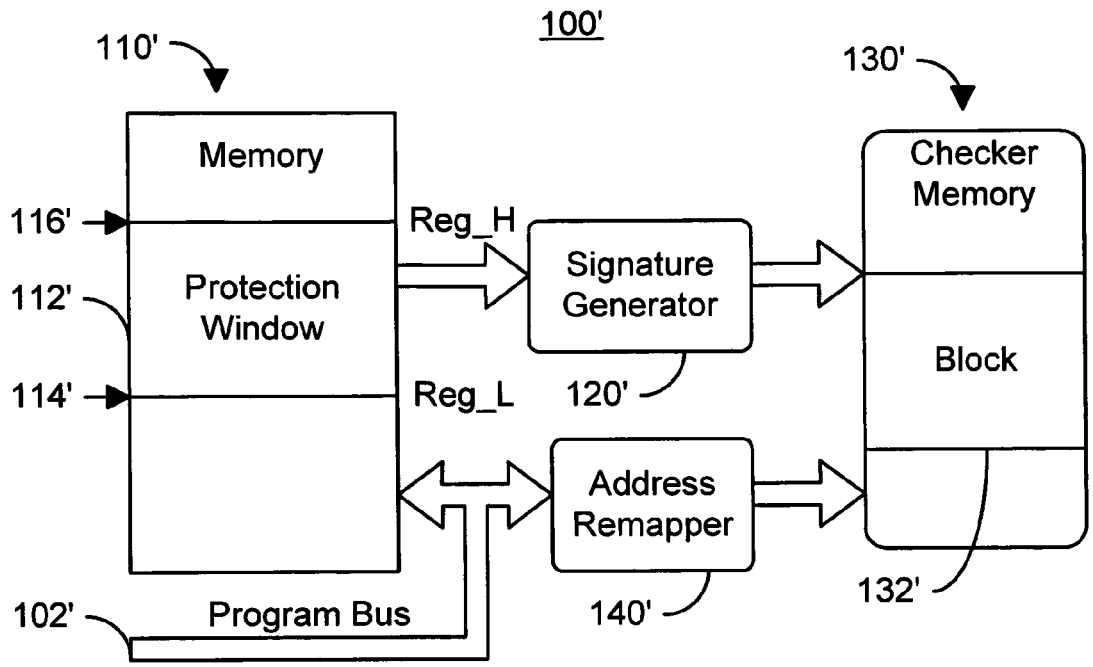
FIG. 4 is a diagram of one embodiment of an architecture in accordance with the present invention for filling the checker memory in protecting data in a computer system.
Figure 5:
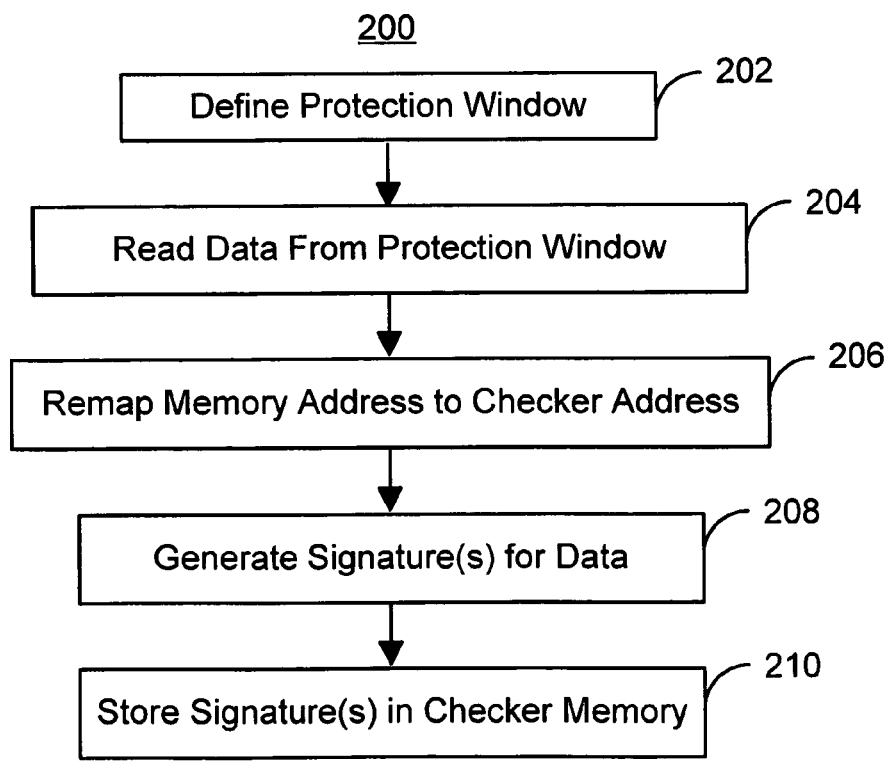
FIG. 5 is a flow chart depicting one embodiment of a method in accordance with the present invention for filling the checker memory in protecting data in a computer system.

To more particularly describe the operation of the system 100, refer to FIGS. 4 and 5. FIG. 4 is a diagram of one embodiment in accordance with the present invention of an architecture 100' for filling the checker memory in protecting data in a computer system. FIG. 5 is a flow chart depicting one embodiment of a method 200 in accordance with the present invention for filling the checker memory in protecting data in a computer system. Referring to FIGS. 4 and 5, the architecture 100' includes portions of the computer system 100. Thus, the architecture 100' depicts program address bus 102', the memory 110' that is preferably a program memory, signature generator 120', checker memory 130' that is preferably a RAM, and address remapper 140'. These components 102', 110', 120', 130' and 140' perform analogous functions to the components 102', 110, 120, 130, and 140, respectively.

The protection window 112' is defined, via step 202. Step 202 is preferably performed by a software developer defining the memory addresses 114' and 116' (registers Reg_L and Reg_H, respectively) as the boundaries of the window. The memory addresses 114' and 116' define the low and high memory addresses of the protection window 112'. In addition, step 202 might be repeated to change the size of the protection window 112' and/or the data protected by the system 100'. Thus, for a memory 110' that is a program memory, the program instructions desired to be protected might be changed.

The data in the protection window 112 are read, via step 204. Step 204 preferably includes reading address by address the n-bit data words stored in each memory address. The memory addresses in the protection window 112' are remapped to checker memory addresses in the checker memory 130' using the address remapper 140', via step 206. In a preferred embodiment, each memory address in the protection window 112' has a single corresponding checker memory address in the checker memory 130'. The memory addresses 114' through 116' are thus preferably remapped to a block 132' in the checker memory 130'. In one embodiment, the address 114 (Reg_L) of the protection window could be associated with a first address (e.g. address 0) in the checker memory 130 in step 206. Thus, the address 116 (Reg_H which is the last address of the protected window) would then be associated with an address that is Reg_H-Reg_L above the second address (e.g. address Reg_H-Reg_L) in step 206. In such an embodiment, the address remapper may use the equation: checker memory address=address in memory 110'-Reg_L. Consequently, for a single protection window, the maximum length of the protection window 112' is less than or equal to the length of the checker memory 130'. If multiple protection windows are used, then the maximum length of the protection window is less than or equal to the length of the block in the checker memory 130' that is associated with that protection window 112'. In addition, in order to protect against an outside attacker locating the address in the checker memory 130' that store the signature, the address could also be scrambled by the address remapper 140 in step 206. The address scrambling could also be performed before or after address translation by the address remapper 140/140' so that filling of the checker memory 130/130'/130" using the method 200 is more robust.

Signatures corresponding to the data in the protection window 112' are generated using the signature generator 120', via step 208. In a preferred embodiment, an m-bit signature is generated for each n-bit data word read in step 202. The parameter m is an indicator of the size of the checker memory 130', the hardware costs, and the robustness of the protection provided. For m=1, the signature provided might correspond to the parity bit function, have a low hardware (checker memory 130') cost, but have less robust fault coverage. For m=n, the signature provided has a high hardware (checker memory 130') cost but have full fault coverage. For most applications, m will be greater than one and less than n. The signatures are stored in the checker memory 130, via step 210. Step 210 includes storing the m-bit signatures in the checker memory addresses determined in step 206.

In a preferred embodiment, the sequence indicated in steps 204, 206, 208, and 210 is commenced by a user accessing a control register. Also in a preferred embodiment, this sequence is performed address by address, word by word. Thus, a word is read from a particular address in the protection window 112' in step 204. The memory address is remapped to a checker memory address, the signature for this word is preferably determined, and the signature stored in a corresponding memory address in the checker memory 130' on the fly in steps 206, 208 and 210, respectively. The sequence of reading a word, remapping the address, generating a corresponding signature, and storing the signature is repeated until all desired data in the protection window 112' has corresponding signatures stored in the block 132' of the checker memory 130'. In one embodiment, a hardware direct memory access (DMA) operation could be used to increase the speed of the method 200. In addition, the steps 204, 206, 208, and 210 are preferably performed during a CPU WAIT state to avoid any attempt by the CPU 104 to access the protection window 112'. Filling the checker memory 130/130' using the steps 204, 206, 208, and 210 could be performed during resets on a default area. Moreover, in an alternate embodiment, a memory 110/110' having a width of 2n (instead of n) might be used to improve the efficiency of the method 200 in terms of area and performance.

Figure 6:
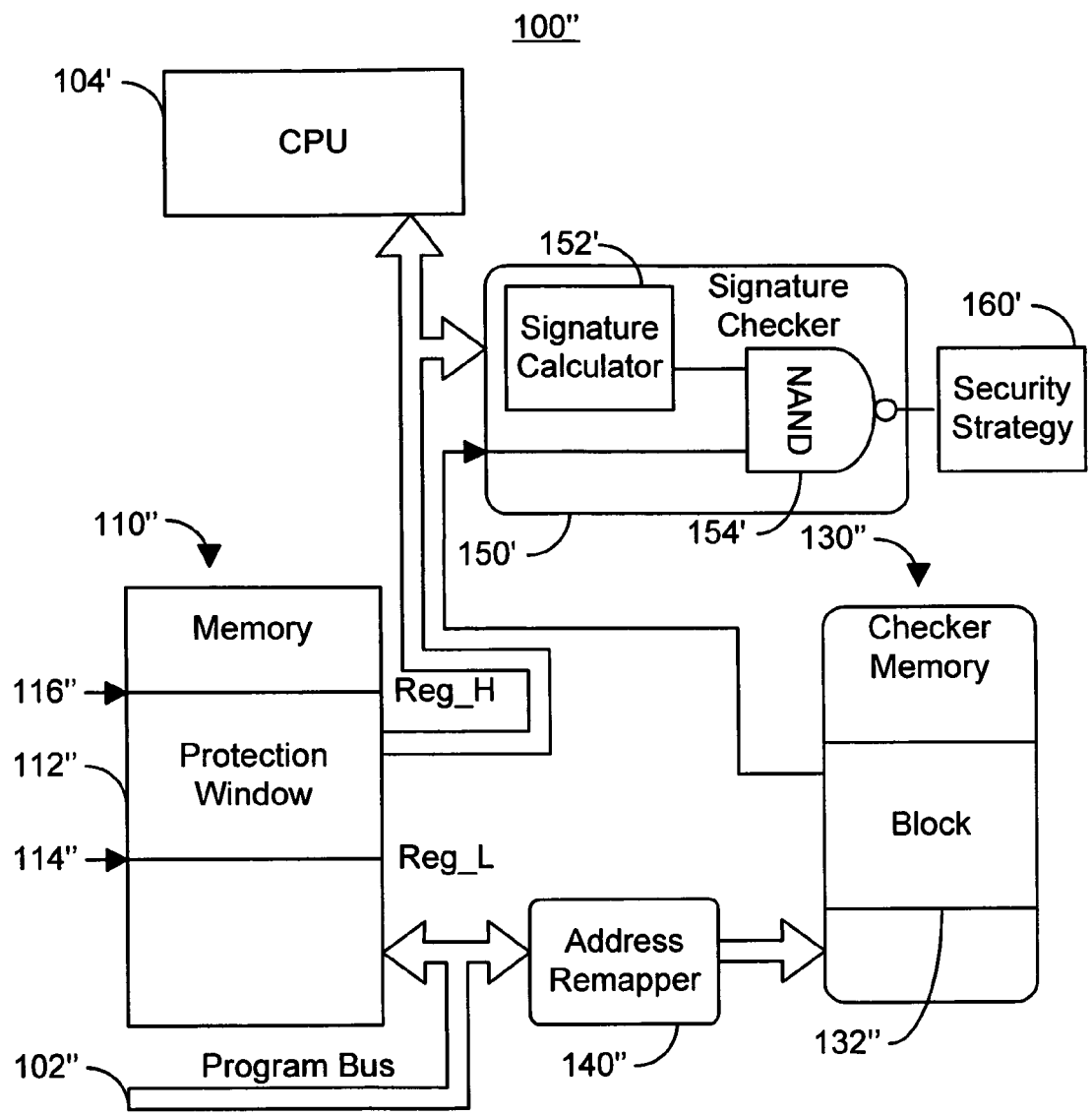
FIG. 6 is a diagram of one embodiment of an architecture in accordance with the present invention for checking data in a computer system.
Figure 7:
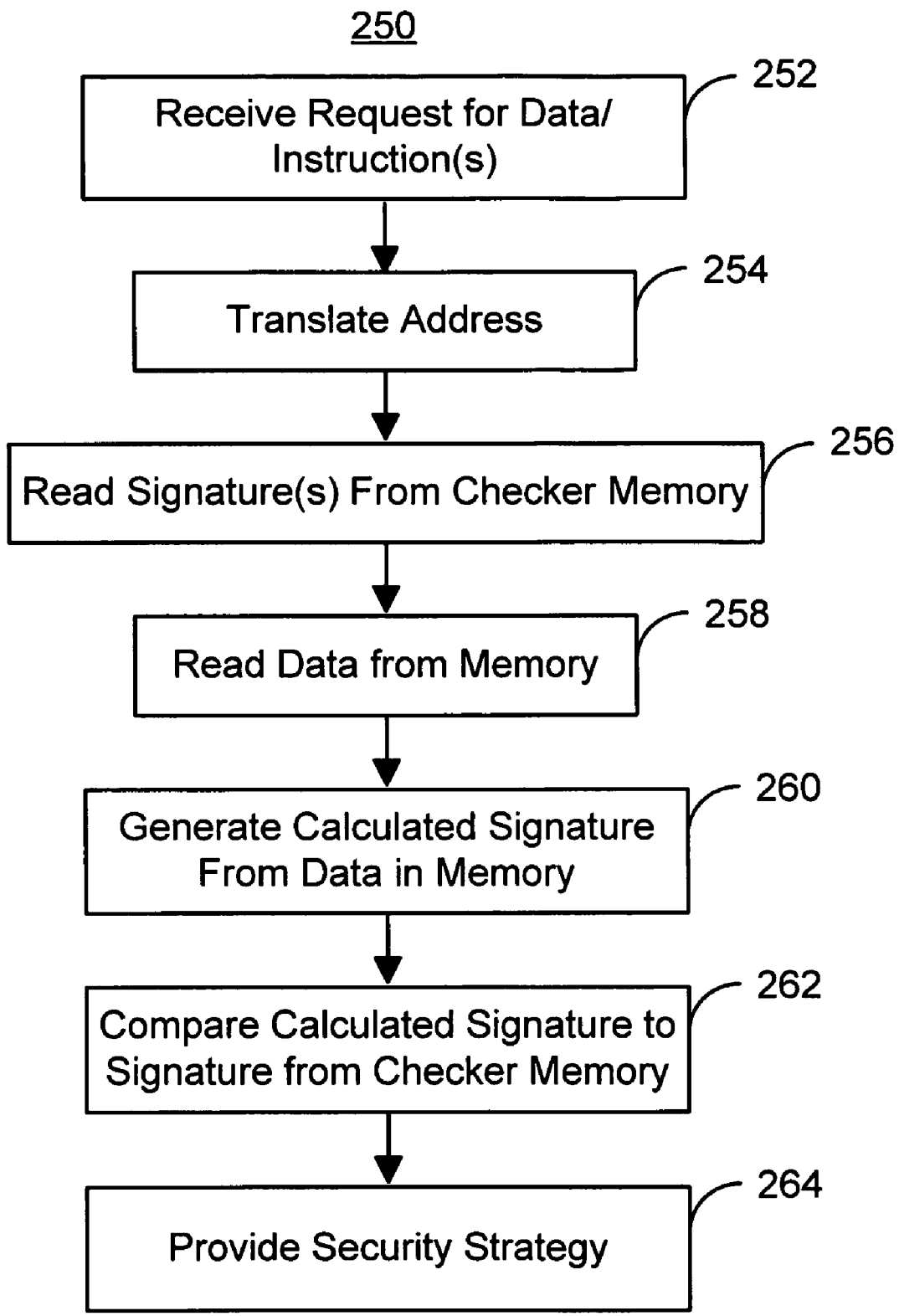
FIG. 7 is a flow chart depicting one embodiment of a method in accordance with the present invention for checking data in a computer system.

FIG. 6 is a diagram of one embodiment in accordance with the present invention an architecture 100" for checking data in a computer system. FIG. 7 is a flow chart depicting one embodiment of a method 250 in accordance with the present invention for checking data in a computer system. Referring to FIGS. 6 and 7, the architecture 100" includes portions of the computer system 100. Thus, the architecture 100" depicts program address bus 102", the system CPU 104', the memory 110" that is preferably a program memory, checker memory 130" that is preferably a RAM, address remapper 140", signature checker 150' and security strategy 160'. These components 102", 104', 110", 130", 140", 150', and 160' perform analogous functions to the components 102, 104, 110, 120, 130, 140, 150, and 160, respectively. In addition, although it is preferred that some components are used in both the architecture 100' of FIG. 4 and the architecture 100" of FIG. 6, nothing prevents at least some of the components from being duplicated. For example, the address remapper 140'/140" is preferably used both in filling the checker memory 130'/130" and when program instructions are to be read and checked. However, in another embodiment, the address remapper 140' could be different from the address remapper 140".

Referring to FIGS. 6 and 7, a request for program instruction(s) in the protection window 112" is received from the program address bus 102", via step 252. In a preferred embodiment, step 252 includes receiving in the memory 110" and the address remapper 140" the memory addresses to be read from the memory 110". Note that if a particular memory address is outside the protection window 112", for example due to a branch/jump or an interrupt, the method 250 simply does not proceed from step 252. When a memory address again is within the protection window, the method 250 recommences. For addresses in the protection window, these addresses are translated to checker memory addresses in the checker memory 130" using the address remapper 140", via step 254.

These checker memory addresses are read from the checker memory 130" to obtain the signatures corresponding to the requested data, via step 256. Also in step 256 the signatures are provided to the signature checker 150'. Thus, the corresponding m-bit signatures are preferably provided to the signature checker 150'. The data (e.g. program instructions) in the memory addresses of the protection window 112' are also read and provided to the signature checker 150', via step 258. Thus, the n-bit word is provided to the signature checker 150'. Also in step 158 the data are preferably provided to the CPU 104'. From the data, signatures are calculated using the signature calculator 152', via step 260. Calculated signatures are thus generated. The calculated signatures are compared to the signatures from the checker memory 130" using the comparator represented by a NAND gate 154', via step 262. Step 262 preferably includes comparing each signature bit by bit. Based on this comparison, a security strategy 160' may be output, via step 264. If the signatures match, then the security strategy 160' preferably simply allows the CPU 104' to continue to use the data (execute the instructions) already fetched. If the signatures do not match, then the security strategy preferably includes a security interrupt, security reset, or other mechanism that interrupts use of the data (execution of the instructions).

In a preferred embodiment, the sequence indicated in steps 252, 254, 256, 258, 260, 262, and 264 is performed address by address, word by word. Thus, a particular memory address in the protection window 112' is received and translated to a corresponding checker memory address in steps 252 and 254. The m-bit signature at this checker memory address and the n-bit data word at the memory address in the program window 112" are read in steps 256 and 258, respectively. The calculated m-bit signature is generated from the n-bit data word in step 260. The calculated m-bit signature is compared to the m-bit signature from the checker memory 130", preferably bit-by-bit, in step 262. A security strategy 160' may then be generated. Steps 252, 254, 256, 258, 260, 262, and 264 may then be repeated for the next address requested. Thus, the signatures stored using the method 200 may be used to check data using the method 250.

Thus, using the method 200/250 and the system 100/100'/100", data such as program instructions in the protection window 112/112' can be protected. In particular, the data may be protected against fault injection in the memory 110/110'/110" while using an architecture that may be optimized to reduce the silicon cost substantially without reducing the efficiency of the protection. Moreover, the method 200/250 and system 100/100'/100" may be customized to provide the particular level of protection desired by the number of bits used in the signature. Consequently, performance of a computer system utilizing the method 200/250 and system 100/100'/100" may be improved.

It is noted that systems often include more than one memory 110/110'/110" that is a program memory storing executable instructions. For example, in a smart card application, ROM, EEPROM, and CPU RAM might be used. Each of these memories could correspond to the memory 110/110'/110". Stated differently, the system 100/100'/100" might be implemented multiple times in a particular computer system In addition, the contents of the checker memory 130/130'/130" may be separately checked via hardware in the system 100/100'/100". For example, signatures are stored in the checker memory 130/130'/130" using the method 200. Subsequently, a user might utilize a CPU register bit to launch a check of the data stored in the memory 110/110'/110" in an analogous manner to the method 250. The results of the check may be stored using a status register bit available for the CPU 104/104'. In addition, when not in use for checking data in the memory 110/110'/110", the checker memory 130/130'/130" might be used by the CPU by remapping the checker memory 130/130'/130" to the CPU data space. Moreover, if the width of the checker memory 130/130'/130" is equal to the width of the program memory 110/110'/100" (e.g. n equals m), the data could be fetched for use by the CPU from the checker memory 130/130'/130" instead of from the memory 110/110'/110". In such an embodiment, a random bit might also be used to select from which memory 130/130'/130" or 110/110'/110" the data (program instructions) would be fetched. Consequently, it is more difficult for an external attacker to know which memory 130/130'/130" or 110/110'/110" is accessed.

Figure 8:
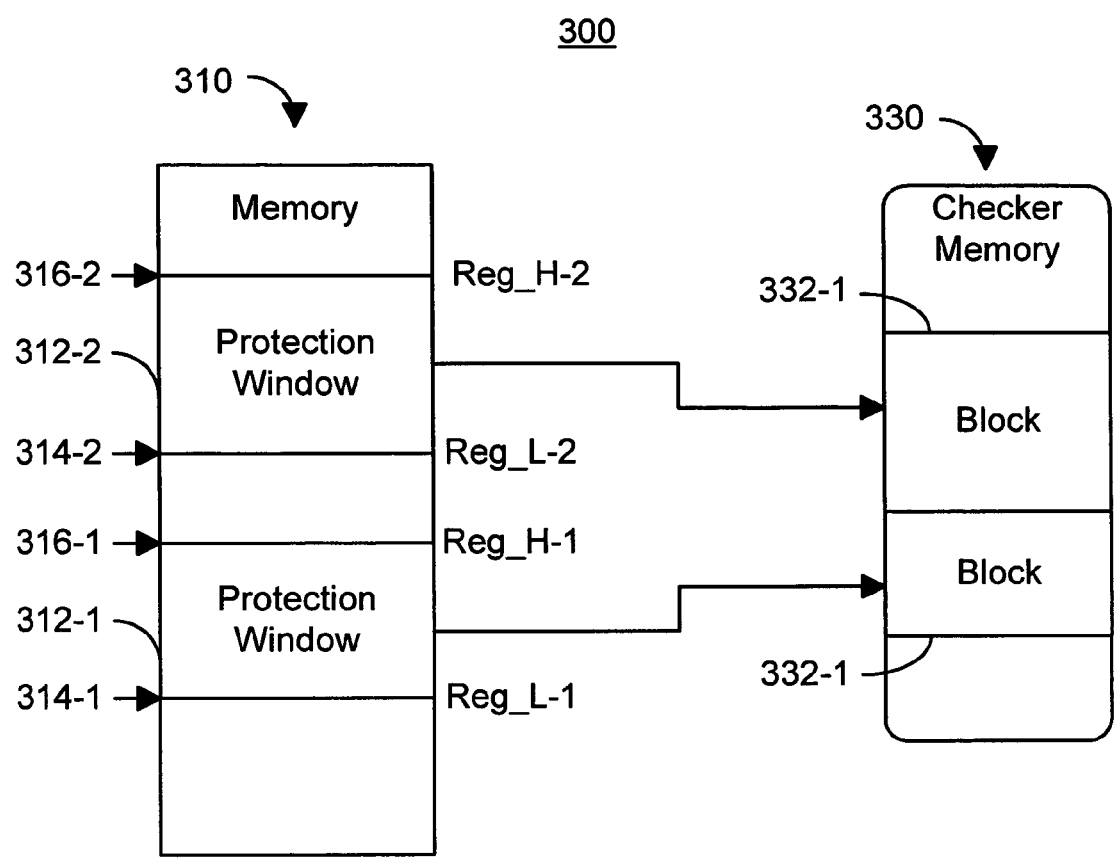
FIG. 8 is a diagram of another embodiment of a system in accordance with the present invention for protecting data in a computer system.

Although the system 100/100'/100" and the methods 200/250 have been described in the context of a single protection window 112/112'/112", multiple protection windows might be used. FIG. 8 is a diagram of another embodiment of a system 300 in accordance with the present invention for protecting data in a computer system. The system 300 is analogous to the system 100/100'/100". Consequently, the system 300 is depicted as including a memory 310 and a checker memory 330 that is separate from the memory 310. The memory 310 is analogous to the memory 110/110'/110". Similarly, the checker memory 330 is analogous to the checker memory 130/130'/130". For simplicity, remaining components, such as signature generator(s), address remapper(s), signature checker(s), and CPU are not shown.

The memory 310 is preferably a program memory and includes two protection windows 312-1 and 312-2. Note that in another embodiment, additional protection windows (not shown) might be implemented. The protection window 312-1 is bounded by addresses 314-1 and 316-1 corresponding to a low register value Reg_L-1 and a high register value Reg_H-1, respectively. The protection window 312-2 is bounded by addresses 314-2 and 316-2 corresponding to a low register value Reg_L-2 and a high register value Reg_H-2, respectively. Each protection window 312-1 and 312-2 is analogous to the protection window 112/112'/112". Furthermore, the protection windows 312-1 and 312-2 need not be adjacent. Stated differently, Reg_H-1 may be different from Reg_L-2.

The checker memory 330 is preferably a RAM and includes two blocks 332-1 and 332-2. The block 332-1 stores signatures for the protection window 314-1. Similarly, the block 332-2 stores signatures for the protection window 312-2. The blocks 332-1 and 332-1 preferably include checker addresses each of which corresponds to a memory address in the protection windows 312-1 and 312-2, respectively. The length of the checker memory 330 should thus be at least the sum of the lengths of the protection windows 312-1 and 312-2.

In operation, the system 300 functions in an analogous manner to the system 100/100'/100". Consequently, the benefits of the systems 100/100'/100" may be achieved. In addition, multiple protection windows 312-1 and 312-2 that are not contiguous may be protected. Utilizing multiple protection windows 312-1 and 312-2 may increase the speed of execution in an application in which multiple critical windows are looped.

A method and system for protecting data in a computer system, particularly instructions stored in a program memory, has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A system for checking data stored in a memory of in a computer system, the memory including a plurality of memory addresses, the system comprising:
    a signature generator coupled with the memory, the signature generator for providing at least one signature corresponding to the data, the data residing in a protection window of the memory, the protection window including at least one memory address of the plurality of memory addresses;
    a checker memory coupled with the signature generator and separate from the memory, the checker memory for storing the at least one signature in at least one checker address, the at least one checker address corresponding to the at least one memory address;
    an address remapper coupled with the memory and the checker memory, the address remapper for translating between the at least one memory address and the at least one checker address; and
    a signature checker coupled with the memory and the checker memory, a signature calculator of the signature checker being separate from the signature generator and providing at least one calculated signature from the data, and the signature checker comparing the at least one calculated signature to the at least one signature from the checker memory.

2. The system of claim 1 wherein the data include a plurality of n-bit data words and wherein the at least one signature generator provides an m-bit signature for each of the plurality of n-bit data words.

3. The system of claim 2 wherein m is greater than or equal to one.

4. The system of claim 2 wherein m is less than or equal to n.

5. The system of claim 1 wherein the checker memory includes a block including the at least one checker address, the block corresponding to a critical protection window.

6. The system of claim 1 wherein the protection window has a first length and the checker memory has a second length at least as long as the first length.

7. The system of claim 1 wherein the checker memory is a random access memory.

8. The system of claim 1 wherein the memory includes a program memory or a data memory.

9. A system for checking data stored in a memory of in a computer system, the memory including a plurality of memory addresses, the data including an n-bit data word residing at each of a portion of the plurality of memory addresses, the system comprising:
- a signature generator coupled with the memory, the signature generator for providing an m-bit signature corresponding to each n-bit data word in the data, the data residing in a protection window of the memory, the protection window having a first length and including a portion of the plurality of memory addresses, m being greater than one and less than or equal to n;
- a checker memory coupled with the signature generator and including a block for storing the at least one signature, the block corresponding to a critical protection window including a plurality of checker addresses corresponding to the portion of the plurality of memory addresses, the checker memory being a dedicated random access memory having a second length not less than the first length and separate from the memory;
- an address remapper coupled with the checker memory and the memory, the address remapper for translating between the at least one memory address and the at least one checker address; and
- a signature checker coupled with the memory and the checker memory, a signature calculator of the signature checker being separate from the signature generator and providing at least one calculated signature from the data, and the signature checker comparing the at least one calculated signature to the at least one signature from the checker memory.

10. A system for checking data stored in a memory of in a computer system, the memory including a plurality of memory addresses, the system comprising:
- a signature generator coupled with the memory, the signature generator for providing at least one signature corresponding to the data, the data residing in a protection window of the memory, the protection window including a portion of the plurality of memory addresses, each of the at least one signature including a plurality of bits;
- a checker memory coupled with the signature generator, the checker memory for storing the at least one signature in at least one checker address, the at least one checker address corresponding to the at least one memory address;
- an address remapper coupled with the memory and the checker memory, the address remapper for translating between the at least one memory address and the at least one checker address; and
- a signature checker coupled with the memory and the checker memory, a signature calculator of the signature checker being separate from the signature generator and providing at least one calculated signature from the data, and the signature checker comparing the at least one calculated signature to the at least one signature from the checker memory.

11. A method for checking data stored in a memory of a computer system, the memory including a plurality of memory addresses, the method comprising:
- allowing a user to define a protection window in the memory, the protection window including a portion of the plurality of memory addresses, the data residing within the portion of the plurality of memory addresses;
- remapping the portion of the plurality of memory addresses to at least one checker address in a checker memory separate from the memory;
- generating at least one signature corresponding to the data by a signature generator;
- storing the at least one signature in the at least one address; and
- if a request for at least a portion of the data is made, generating at least one calculated signature from the data by a signature calculator separate from the signature generator.

12. The method of claim 11 wherein the data include a plurality of n-bit data words and wherein the at least one signature generating further includes:
- providing an m-bit signature for each of the plurality of n-bit data words.

13. The method of claim 12 wherein m is greater than one.

14. The method of claim 12 wherein m is less than or equal to n.

15. The method of claim 11 wherein the checker memory includes a block including the at least one checker address, the block corresponding to a critical protection window.

16. The method of claim 11 wherein the protection window has a first length and the checker memory has a second length at least as long as the first length.

17. The method of claim 11 wherein the checker memory is a random access memory.

18. The method of claim 11 further comprising:
- if a request for at least a portion of the data is made, translating the portion of the plurality of memory addresses to the at least one checker address;
- if a request for at least a portion of the data is made, obtaining the at least one signature from the checker;
- if a request for at least a portion of the data is made, comparing the at least one calculated signature to the at least one signature from the checker memory; and
- if a request for at least a portion of the data is made, determining a security strategy based upon the comparing of the at least one calculated signature to the at least one signature from the checker memory.

19. The method of claim 11 wherein the memory is a program memory.

20. A method for checking data stored in a memory of in a computer system, the memory including a plurality of memory addresses, the data including an n-bit data word residing at each of a portion of the plurality of memory addresses, the method comprising:
- defining a protection window in the memory, the protection window including the portion of the plurality of memory addresses and having a first length;
- remapping the portion of the plurality of memory addresses to at least one checker address in a block of a checker memory, the checker memory being a dedicated random access memory having a second length not less than the first length and separate from the memory, the block corresponding to a critical protection window;
- generating an m-bit signature for each n-bit data word in the data by a signature generator, m being greater than one and less than or equal to n;
- storing the at least one signature in the at least one address; and
- if a request for at least a portion of the data is made, translating the portion of the plurality of memory addresses to the at least one checker address, obtaining the at least one signature from the checker, generating at least one calculated signature from the data by a signature calculator separate from the signature generator, comparing the at least one calculated signature to the at least one signature from the checker memory, and determining a security strategy based upon the comparing of the at least one calculated signature to the at least one signature from the checker memory.

21. A computer-readable medium including a program for checking data stored in a memory of a computer system, the memory including a plurality of memory addresses, the program including instructions for:
- allowing a user to define a protection window in the memory, the protection window including a portion of the plurality of memory addresses, the data residing within the portion of the plurality of memory addresses;
- remapping the portion of the plurality of memory addresses to at least one checker address in a checker memory separate from the memory;
- generating at least one signature corresponding to the data by a signature generator;
- storing the at least one signature in the at least one address; and
- if a request for at least a portion of the data is made, generating at least one calculated signature from the data by a signature calculator separate from the signature generator.

22. The computer-readable medium of claim 21 wherein the program further includes:
- if a request for at least a portion of the data is made, translating the portion of the plurality of memory addresses to the at least one checker address;
- if a request for at least a portion of the data is made, obtaining the at least one signature from the checker;
- if a request for at least a portion of the data is made, comparing the at least one calculated signature to the at least one signature from the checker memory; and
- if a request for at least a portion of the data is made, determining a security strategy based upon the comparing of the at least one calculated signature to the at least one signature from the checker memory.

23. The method of claim 20 wherein the memory is a program memory.

24. A method for checking data stored in a memory of in a computer system, the memory including a plurality of memory addresses, the data including an n-bit data word residing at each of a portion of the plurality of memory addresses, the method comprising:
- defining a protection window in the memory, the protection window including the portion of the plurality of memory addresses and having a first length;
- remapping the portion of the plurality of memory addresses to at least one checker address in a block of a checker memory, the checker memory being a dedicated random access memory having a second length not less than the first length and separate from the memory, the block corresponding to a critical protection window;
- generating an m-bit signature for each n-bit data word in the data by a signature generator, m being greater than one and less than or equal to n;
- storing the at least one signature in the at least one address; and
- if a request for at least a portion of the data is made, translating the portion of the plurality of memory addresses to the at least one checker address, obtaining the at least one signature from the checker memory, generating at least one calculated signature from the data by a signature calculator separate from the signature generator, comparing the at least one calculated signature to the at least one signature from the checker memory, and determining a security strategy based upon the comparing of the at least one calculated signature to the at least one signature from the checker memory.

* * * * *